(12) United States Patent
Chen et al.

(10) Patent No.: US 6,238,101 B1
(45) Date of Patent: May 29, 2001

(54) TUNABLE FIBER OPTIC CONNECTOR

(75) Inventors: Wenzong Chen, Naperville; Yuriy Belenkiy, Niles; Igor Grois, Northbrook; Gary Koliopoulos, Morton, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/349,756

(22) Filed: Jul. 8, 1999

(51) Int. Cl.$^7$ .................................................. G02B 6/38
(52) U.S. Cl. ........................ 385/60; 385/58; 385/59; 385/62
(58) Field of Search .................... 385/60, 58, 59, 385/62, 66, 84, 78, 136, 137, 139

(56) References Cited

U.S. PATENT DOCUMENTS

| | | | |
|---|---|---|---|
| 5,134,677 | 7/1992 | Leung et al. | 385/84 |
| 5,142,598 | 8/1992 | Tabone | 385/78 |
| 5,146,525 | 9/1992 | Tabone | 385/78 |
| 5,212,753 | 5/1993 | Maranto | 385/80 |
| 5,384,885 | 1/1995 | Diner | 385/140 |
| 5,390,269 | 2/1995 | Palecek et al. | 385/78 |
| 5,436,995 | 7/1995 | Yoshizawa et al. | 375/86 |

Primary Examiner—Mohammad Sikder
(74) Attorney, Agent, or Firm—A. A. Tirva

(57) ABSTRACT

A fiber optic connector assembly is arranged for adjusting the rotational position of a terminated optical fiber about its axis relative to the axis of the connector assembly. A connector body has a central bore extending rearwardly from a front end of the body. An inner plug terminates the optical fiber and is positioned in the bore of the body. The plug is captured axially in the body but is rotatable relative to the body about the axis of the fiber. Complementary interengaging keys and keyways are provided between the plug and the body to define a plurality of positions of rotational adjustment of the plug about the axis of the fiber relative to the body. Tool engaging portions on the plug are accessible through the front open end of the body so that an adjusting tool can be inserted thereinto after the connector assembly is assembled to rotationally adjust the plug relative to the body.

12 Claims, 4 Drawing Sheets

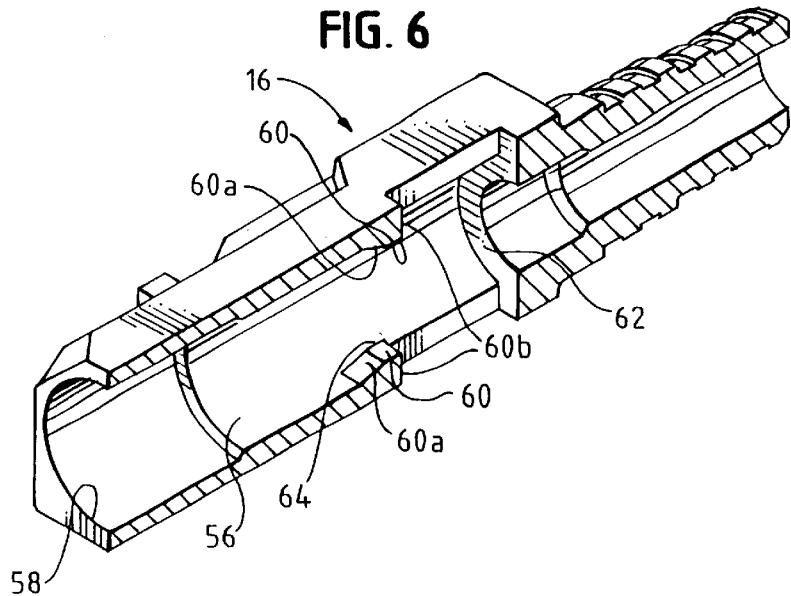
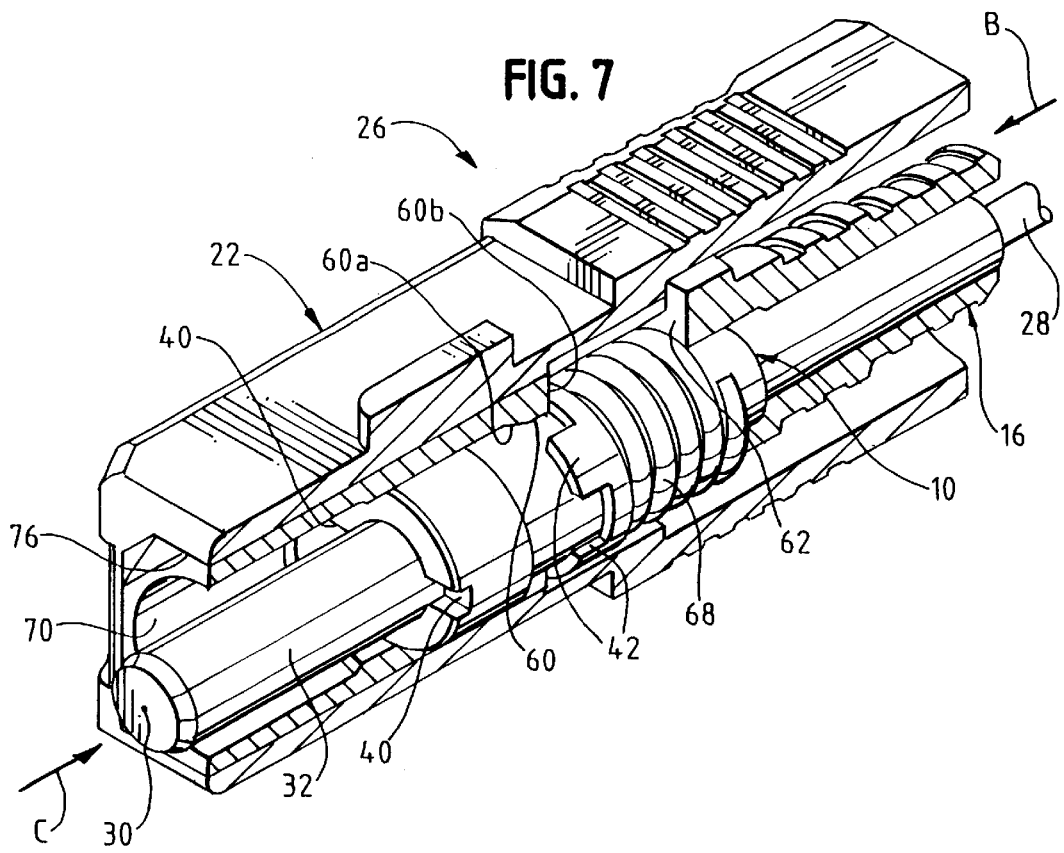

TUNABLE FIBER OPTIC CONNECTOR

FIELD OF THE INVENTION

This invention generally relates to the art of fiber optic connectors and, particularly, to a fiber optic connector assembly wherein the connector can be "tuned" by selectively adjusting the rotational position of a terminated optical fiber about its own axis.

BACKGROUND OF THE INVENTION

In the field of fiber optic signal transmission, proper centering of the optical fiber in the connector is critical to avoid what is called "insertion losses", i.e., losses in the transmission of light waves through the connector. Most often, an optical fiber is terminated within a cylindrical ferrule fabricated of such materials as ceramic. Known processes allow the fiber to be generally centered in a bore of the ferrule. The ferrule then is positioned within the fiber optic connector by various connector bodies, plugs or the like.

However, problems are caused because the core of the optical fiber is not centered within the ferrule. This creates "insertion losses". The core can be misaligned for various reasons. First, the core may not be centered with respect to the outside diameter of the fiber. Second, the hole in the ferrule which receives the fiber may not be centered with respect to the outside diameter of the ferrule. Third, the hole in the ferrule is bigger than the fiber and the fiber may be offset in the hole. Other considerations include the fact that the fiber may not even be round.

The present invention is directed to solving the problems discussed above by a fiber optic connector assembly which includes two parts, namely a connector body and an inner plug and wherein the inner plug can be rotationally adjusted relative to the connector body after assembly of the body in an outer member, with the adjustment being carried out from the front of the connector after it has been assembled. This procedure effectively "tunes" the connector by rotationally adjusting the plug so that the fiber core offset is towards a predetermined reference, usually the connector key. Optimum fiber alignment (or lowest insertion loss) is achieved at the interface of two such tuned connectors.

SUMMARY OF THE INVENTION

An object, therefore, of the invention is to provide a new and improved fiber optic connector assembly arranged for adjusting the rotational position of a terminated optical fiber about its axis relative to the axis of the connector assembly.

In the exemplary embodiment of the invention, an outer coupling member is provided for coupling the connector assembly to an appropriate complementary mating fiber optic connecting device, such as a mating connector assembly. An intermediate connector body is insertable into the outer coupling member. The body has a central bore extending rearwardly from a front open end of the body. An inner plug terminates the optical fiber and is positioned in the bore of the connector body. The plug is captured axially in the body but is rotatable relative to the body about the axis of the fiber. Complementary interengaging keying means are provided between the inner plug and the connector body to define a plurality of positions of rotational adjustment of the plug about the axis of the fiber relative to the body. Tool engaging means are provided on the inner plug accessible through the front open end of the connector body. Therefore, an adjusting tool can be inserted into the open front end of the connector body after the connector assembly is assembled and into engagement with the inner plug to rotationally adjust the plug relative to the body.

As disclosed herein, the inner plug is mounted for limited axial movement within the connector body. A spring is interposed between the plug and the body for biasing the inner plug forwardly. The complementary interengaging keying means include at least one axially extending key on one of the inner plug or connector body engageable within one of a plurality of axially opening keyways in the other of the plug or body. The spring is effective to bias the key into a selected keyway.

The inner plug includes a forwardly projecting fiber-terminating ferrule spaced inwardly of the interior of the bore in the connector body. The tool engagement means is located on the plug for access by the adjusting tool inserted between the ferrule and the interior of the bore in the body.

The inner plug is a "universal" component that can be used in different forms of fiber optic connector assemblies. In other words, the connector assembly may be a "FC" connector, and the outer coupling member may be a rotatable coupling nut axially captured about the intermediate connector body. Alternatively, the connector assembly may be a "SC", connector, and the outer coupling member may be a push-pull type coupling member non-rotatably mounted about the intermediate connector body.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 6 is an isometric/axial section of the connector body of the "SC" connector; and FIG. 7 is an isometric/axial section through the assembled "SC" connector.

DETAILED DESCRIPTION OF THE PREFERRED EMBODIMENTS

Figure 1:
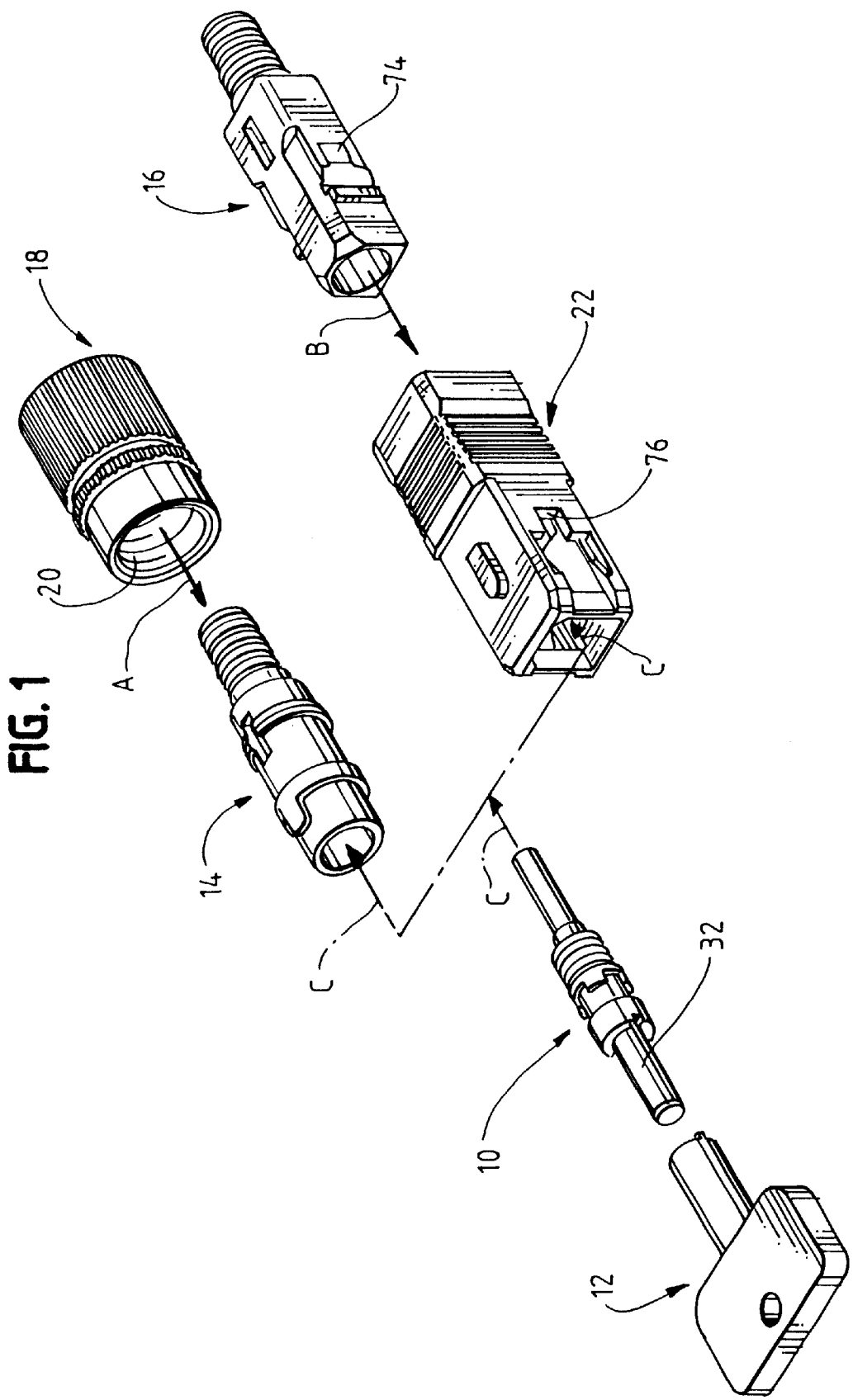
FIG. 1 is an exploded isometric view showing that the inner plug and adjusting tool of the invention can be used is either a "FC" or a "SC" connector.
Figure 2:
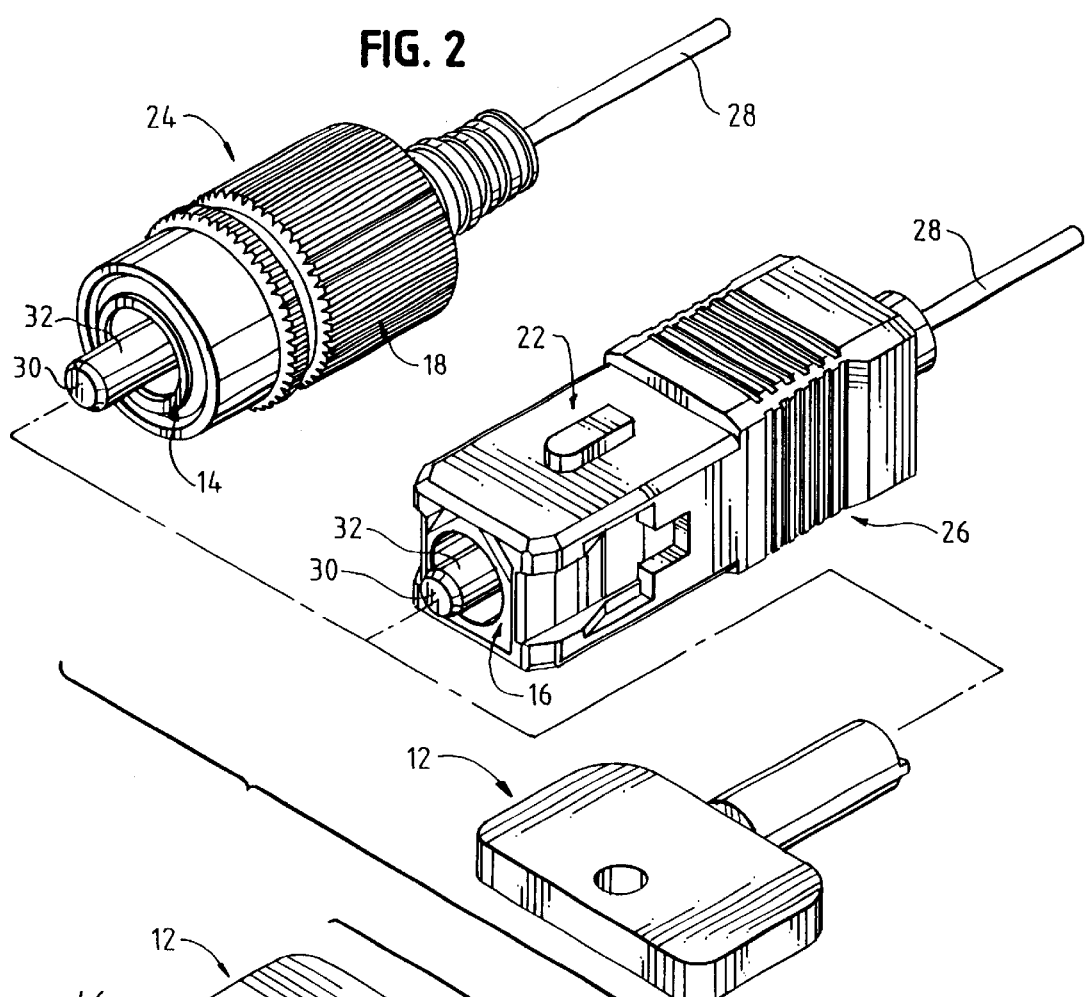
FIG. 2 is an isometric view of the "FC" and "SC" connectors in assembled condition, along with the common adjusting tool.

Referring to the drawings in greater detail, and first to FIGS. 1 and 2, the invention is embodied in a "universal" system which includes a universal or common inner plug, generally designated 10, adjustable by an adjusting tool, generally designated 12. The plug is insertable into either a connector body, generally designated 14, of a "FC" connector assembly or a connector body, generally designated 16, of a "SC" connector assembly. As seen in FIG. 1, a rotatable coupling nut, generally designated 18, is internally threaded at 20 and is positionable over connector body 14 in the direction of arrow "A". Connector body 16 is insertable in the direction of arrow "B" into a "SC" coupling member, generally designated 22. Whereas coupling nut 18 is free to rotate about connector body 14, coupling member 22 is nonrotatably mounted about connector body 16. Universal plug 10 is insertable into either connector body 14 or connector body 16 in the direction of arrows "C".

FIG. 2 shows a fully assembled "FC" connector assembly, generally designated 24, and a fully assembled "SC" connector assembly, generally designated 26. Each connector assembly terminates a fiber optic cable 28 projecting out of the rear of the assembly. An optical fiber or core 30 is terminated in a ferrule 32 of either assembly, the ferrule being part of the universal inner plug 10 (FIG. 1). Adjusting tool 12 can be used with either connector assembly 24 or 26 as shown in FIG. 2.

Figure 3:
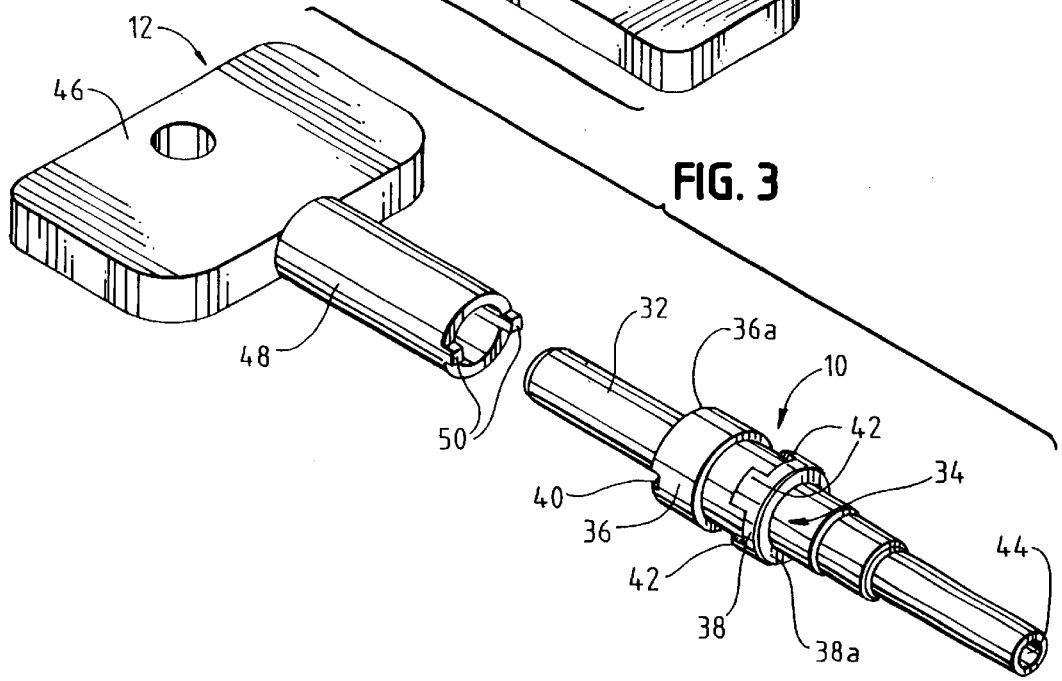
FIG. 3 is an isometric view of the common inner plug and adjusting tool.

FIG. 3 shows common adjusting tool 12 along with common or universal inner plug 10 isolated from the other components of the connector assemblies. Plug 10 includes forwardly projecting ferrule 32 which may be fabricated of ceramic material. The ferrule is fixed to a plug body, generally designated 34, which includes a front peripheral flange 36 and a rear peripheral flange 38. The front peripheral flange defines a forwardly facing circular or ring-like shoulder 36a, and the rear peripheral flange defines a rearwardly facing circular or ring-like shoulder 38a. A pair of diametrically disposed tool-receiving notches 40 are formed in circular shoulder 36a. Four equally spaced keys 42 project forwardly from rear peripheral flange 38. Plug body 34 has a through bore 44 for receiving the fiber optic cable 28 (FIG. 2). The cable typically is fixed within the body by an appropriate adhesive, and the optical fiber 30 (FIG. 2) is terminated within ferrule 32.

Still referring to FIG. 3, common tool 12 has a head portion 46 for grasping by an operator, along with a cylinder 48 which is positionable over ferrule 32. A pair of diametrically disposed adjusting tabs 50 project forwardly of cylinder 48 for insertion into notches 40 in circular shoulder 36a of plug body 34.

Figure 4:
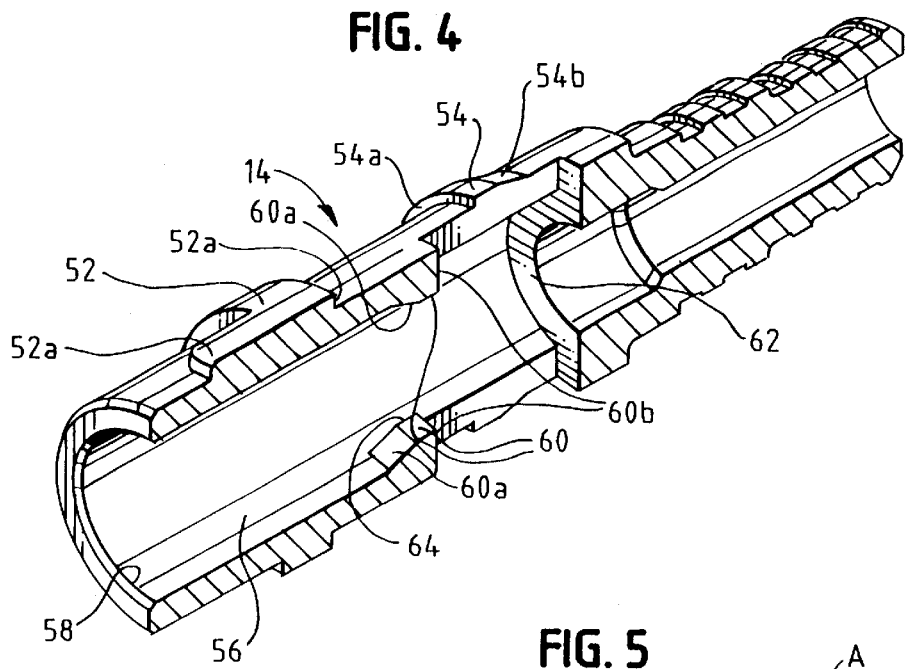
FIG. 4 is an isometric/axial section of the connector body of the "FC" connector.

FIG. 4 shows "FC" connector body 14 to include a front peripheral flange 52 and a rear peripheral flange 54. A connector key 52a projects forwardly of front peripheral flange 52 for engagement with a complementary mating connecting device (not shown). The front peripheral flange has a rearwardly facing circular shoulder 52a. Rear peripheral flange 54 has a forwardly facing circular shoulder 54a and a rearwardly extending chamfered circular surface 54b.

Still referring to FIG. 4, "FC" connector body 14 includes a central bore 56 extending rearwardly from a front open end 58 of the connector body. A pair of key bosses 60 project radially inwardly on diametrically opposite sides of bore 56. Each key boss has a front chamfered surface 60a and an abrupt or radially extending rear surface 60b. A forwardly facing circular shoulder 62 is formed within central bore 56 spaced rearwardly of abrupt rear surfaces 60b of key bosses 60. In essence, the key bosses define two keyways 64 between the bosses within central bore 56.

Figure 5:
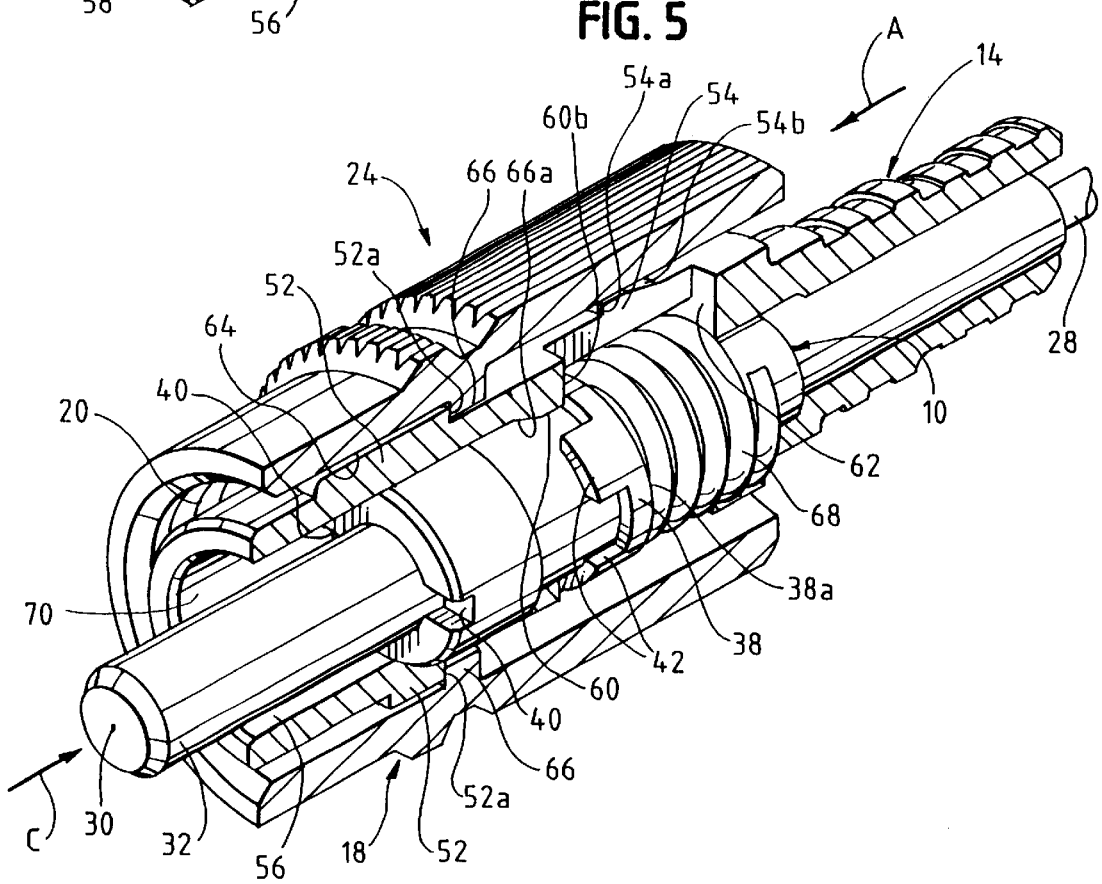
FIG. 5 is an isometric/axial section through the assembled "FC" connector.

FIG. 5 shows a section through the fully assembled "FC" connector assembly 24. It can be seen that coupling nut 18 has an interior bore 64 with a radially inwardly projecting circular flange 66. In assembly, coupling nut 18 is positioned over connector body 14 in the direction of arrow "A" (also see FIG. 1). Interior flange 66 rides over chamfered circular surface 54b of rear peripheral flange 54 of the connector body and snaps into position between forwardly facing circular shoulder 54a of rear peripheral flange 54 and rearwardly facing circular shoulder 52a of front peripheral flange 52 of the connector body. The coupling nut then is free to rotate about the connector body whereby the internal threads 20 of the coupling nut can be threaded onto a complementary connecting device such as a complementary "FC" adapter.

Still referring to FIG. 5, universal plug 10 is inserted into connector body 14 in the direction of arrow "C" (also see FIG. 1). During assembly, rear peripheral flange 38 of the plug rides over front chamfered surfaces 62a of key bosses 62 within central bore 56 of the connector body. Rear peripheral flange 38 then snaps behind abrupt rear surfaces 60b of the key bosses. It can be seen that two of the forwardly projecting keys 42 of plug 10 are located within the keyway defined between key bosses 62. Finally, a coil spring 68 is sandwiched between rearwardly facing circular shoulder 38a of rear peripheral flange 38 of the inner plug and forwardly facing circular shoulder 62 of connector body 14. The spring is effective to bias the inner plug, along with optical fiber 30, forwardly relative to connector body 14.

In order to adjust the rotational position of inner plug 10 and the terminated optical fiber 30 relative to connector body 14 and the remainder of "FC" connector 24, cylinder 48 of tool 12 is inserted into a space generally designated 70 in FIG. 5, between the outside diameter of ferrule 32 and the inside diameter of central bore 56 of the connector body. Adjusting tabs 50 of the adjusting tool will seat within notches 40. The tool is used to push the inner plug rearwardly, compressing spring 68 and moving keys 42 of the plug out of keyways 64 of the connector body. With adjusting tabs 50 located within notches 40, the inner plug can be rotated relative to the connector body by rotating the adjusting tool. Upon release of the tool, keys 42 will be biased forwardly into keyways 64 in whatever rotational position of adjustment has been achieved.

Referring to FIG. 6, "SC" connector body 16 has a central bore 56 configured substantially identical to central bore 56 of "FC" connector body 14 so that both bodies can equally receive and function identically with universal plug 10. Therefore, like numerals are being applied in FIGS. 6 and 7 corresponding to like components described above in relation to connector body 14 in FIGS. 4 and 5.

More particularly, referring to FIG. 6, central bore 56 of "SC", connector body 16 extends rearwardly from a front open end 58. A pair of key bosses 60 project inwardly of the bore, and the bosses have chamfered front surfaces 60a and abrupt rear surfaces 60b. A circular shoulder 62 faces forwardly at a location spaced rearwardly of abrupt rear surfaces 60b of the key bosses. Again, the key bosses define keyways 64 therebetween.

As stated above, "SC" connector body 16 is inserted into coupling member 22 in the direction of arrow "B" as shown in FIG. 1. FIG. 1 also shows that a latch boss 74 projects outwardly from each opposite side of connector body 16. Each latch boss 74 snaps behind a latch shoulder 76 formed on coupling member 22. The exterior profile of connector body 16 is polygonal and fits within a polygonal bore 76 (FIG. 7) of coupling member 22. Therefore, connector body 16 is non-rotatably mounted within coupling member 22.

Inner plug 10 is assembled within "SC" connector body 16 in the direction of arrow "C" as seen in FIG. 7. The comparison of the interior of connector body 16 with the interior of "FC" connector body 14 in FIG. 5 reveals that the assembly and interaction of universal plug 10 is the same with both types of connector assemblies and will not be repeated herein. In addition, the operation of adjusting tool 12 with inner plug 10 and "SC" connector 26 is the same as with "FC" connector 24 (FIG. 5) and will not be repeated. Suffice it to say, universal plug 10 is adjusted by common adjusting tool 12 after either of the connector assemblies are assembled and from exteriorly of the assemblies at the front ends thereof.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber optic connector assembly arranged for adjusting the rotational position of a terminated optical fiber about its axis relative to the axis of the connector assembly, comprising:

an outer coupling member for coupling the connector assembly to an appropriate complementary mating fiber optic connecting device;

an intermediate connector body insertable into the outer coupling member, the body having a central bore extending rearwardly from a front open end of the body;

an inner plug for terminating the optical fiber and positioned in the central bore of the connector body, the plug being captured axially in the body but being rotatable relative to the body about the axis of the fiber;

complementary interengaging keying means between the inner plug and the connector body to define a plurality of positions of rotational adjustment of the plug about the axis of the fiber relative to the body; and tool engagement means on the inner plug accessible through the front open end of the connector body, whereby an adjusting tool can be inserted into the open front end of the connector body after the connector assembly is assembled and into engagement with the inner plug to rotationally adjust the plug relative to the body.

2. The fiber optic connector assembly of claim 1 wherein said inner plug is mounted for limited axial movement within the connector body, and including spring means interposed between the plug and the body for biasing the plug forwardly.

3. The fiber optic connector assembly of claim 1 wherein said complementary interengaging keying means include at least one axially extending key on one of the inner plug and connector body engageable within one of a plurality of axially opening keyways in the other of the plug and body.

4. The fiber optic connector assembly of claim 3 wherein said inner plug is mounted for limited axial movement within the connector body, and including spring means interposed between the plug and the body for biasing the axially extending key into the axially opening keyways.

5. The fiber optic connector assembly of claim 1 wherein said inner plug includes a forwardly projection fiber-terminating ferrule spaced inwardly of the interior of the central bore in the connector body, and said tool engagement means is located on the plug for access by the adjusting tool inserted between the ferrule and the interior of the bore in the body.

6. The fiber optic connector assembly of claim 1 wherein said outer coupling member comprises a rotatable coupling nut axially captured about the intermediate connector body.

7. The fiber optic connector assembly of claim 1 wherein said outer coupling member comprises a push-pull type coupling member non-rotatably mounted about the intermediate connector body.

8. A fiber optic connector assembly arranged for adjusting the rotational position of a terminated optical fiber about its axis relative to the axis of the connector assembly, comprising:

a connector body having a central bore extending rearwardly from a front open end of the body;

an inner plug for terminating the optical fiber and positioned in the central bore of the connector body, the plug being captured axially in the body but being rotatable relative to the body about the axis of the fiber;

complementary interengaging keying means between the inner plug and the connector body to define a plurality of positions of rotational adjustment of the plug about the axis of the fiber relative to the body; and tool engagement means on the inner plug accessible through the front open end of the connector body, whereby an adjusting tool can be inserted into the open front end of the connector body after the connector assembly is assembled and into engagement with the inner plug to rotationally adjust the plug relative to the body.

9. The fiber optic connector assembly of claim 8 wherein said inner plug is mounted for limited axial movement within the connector body, and including spring means interposed between the plug and the body for biasing the plug forwardly.

10. The fiber optic connector assembly of claim 8 wherein said complementary interengaging keying means include at least one axially extending key on one of the inner plug and connector body engageable within one of a plurality of axially opening keyways in the other of the plug and body.

11. The fiber optic connector assembly of claim 10 wherein said inner plug is mounted for limited axial movement within the connector body, and including spring means interposed between the plug and the body for biasing the axially extending key into the axially opening keyways.

12. The fiber optic connector assembly of claim 8 wherein said inner plug includes a forwardly projection fiber-terminating ferrule spaced inwardly of the interior of the central bore in the connector body, and said tool engagement means is located on the plug for access by the adjusting tool inserted between the ferrule and the interior of the bore in the body.

\* \* \* \* \*